US011067138B2

United States Patent
Leonov

(10) Patent No.: US 11,067,138 B2
(45) Date of Patent: Jul. 20, 2021

(54) DEVICE FOR PREVENTION OF TURBINE ROTATION

(71) Applicant: OKLAS TECHNOLOGIES LIMITED LIABILITY COMPANY, Moscow (RU)

(72) Inventor: Vyacheslav Vladimirovich Leonov, Moscow (RU)

(73) Assignee: OKLAS TECHNOLOGIES LIMITED LIABILITY COMPANY, Moscow (RU)

( * ) Notice: Subject to any disclaimer, the term of this patent is extended or adjusted under 35 U.S.C. 154(b) by 48 days.

(21) Appl. No.: 16/680,502

(22) Filed: Nov. 12, 2019

(65) Prior Publication Data
US 2020/0166088 A1     May 28, 2020

(30) Foreign Application Priority Data
Nov. 28, 2018   (RU) ........................... RU2018141914

(51) Int. Cl.
*F16D 41/18* (2006.01)
*E21B 4/00* (2006.01)
(Continued)

(52) U.S. Cl.
CPC ............ *F16D 41/185* (2013.01); *E21B 4/006* (2013.01); *E21B 4/04* (2013.01); *F16D 45/00* (2013.01)

(58) Field of Classification Search
CPC ...... F16D 41/185; F16D 41/064; F16D 13/44; F16D 2023/123; F16D 45/00;
(Continued)

(56) References Cited

U.S. PATENT DOCUMENTS 2,564,838 A * 8/1951 Garey ................... F04D 29/044
                                                       403/81
2,962,128 A * 11/1960 Luenberger ............. F16D 41/00
                                                    188/82.84
(Continued)

FOREIGN PATENT DOCUMENTS

RU         55 018        7/2006
RU         56 940        9/2006
(Continued)

*Primary Examiner* — Mark A Manley
(74) *Attorney, Agent, or Firm* — Nixon & Vanderhye P.C.

(57) ABSTRACT

The invention relates to pumping equipment and can be used in oil industry as part of submersible electric centrifugal pump units. Device for prevention of turbine rotation consists of interconnected head and base, inside of which two shafts are installed on bearing supports—upper and lower ones, connected to each other through a cam clutch with the possibility of free running in the circumferential direction. The overrunning clutch is installed in the head, providing torque transmission in the forward direction from the lower shaft to the upper one and preventing reverse rotation of the upper shaft. The overrunning clutch is connected with the upper shaft via a coupling clutch, movable part of which is mounted on the upper shaft with possibility of axial movement, and stationary part is rigidly connected to the overrunning clutch. Coupling of the coupling clutch is provided by a spring, and disconnection is provided by a pusher mounted on the upper shaft with possibility of axial movement, and on one side the pusher is connected to the movable part of the coupling clutch and on the other side—with a bush sleeve having an inclined end surface rigidly installed on the lower shaft. The technical result is to increase reliability and safety of Electric Centrifugal Pumping Unit due to use of the apparatus for preventing rotation of the turbine.

6 Claims, 4 Drawing Sheets

(51) Int. Cl.
*E21B 4/04* (2006.01)
*F16D 45/00* (2006.01)

(58) Field of Classification Search
CPC ........ F04D 13/10; F04D 29/044; E21B 4/006;
E21B 4/04; E21B 43/128; E21B 43/121;
E21B 43/12
See application file for complete search history.

(56) References Cited

U.S. PATENT DOCUMENTS

| | | | |
|---|---|---|---|
| 9,027,717 B2 * | 5/2015 | Hult | ........................ F16D 51/48 |
| | | | 188/184 |
| 2014/0048246 A1 | 2/2014 | Cemin | |
| 2017/0051798 A1 * | 2/2017 | Otozai | .................. F16D 41/063 |

FOREIGN PATENT DOCUMENTS

| | | |
|---|---|---|
| RU | 70 544 | 1/2008 |
| RU | 76 380 | 9/2008 |
| RU | 83 799 | 6/2009 |
| RU | 100 579 | 12/2010 |
| RU | 2449187 C2 | 4/2012 |
| RU | 2608108 C1 | 1/2017 |
| RU | 175262 U1 | 11/2017 |
| RU | 2667961 C1 | 9/2018 |

* cited by examiner

DEVICE FOR PREVENTION OF TURBINE ROTATION

FIELD OF THE INVENTION

The invention relates to the field of pumping equipment and can be used in the oil industry in the installations of submersible centrifugal pumps.

BACKGROUND

The most common method for extracting formation fluid from boreholes is a production method using a submersible installation of an Electric Centrifugal Pumping Unit (ECPU). The ESPU consists of the following main units: submersible electric motor, hydraulic protection and multi-stage centrifugal pump. The ESPU goes down into the well on a tubing string. The power and control of the electric motor with a help of a ground control station (CS) is carried out by a cable, lowered from the borehole. At the pump outlet, a check valve is installed, which serves to hold the liquid column in the tubing string when the pump is turned off and prevents the liquid from returning through the pump, which would lead to a turbine rotation of the ECPU shaft. As a result of the turbine rotation, the following problems arise:
1) failure of the electric motor at its restarting during turbine rotation;
2) loss of time associated with the need to wait for the complete draining of fluid from the tubing string to re-start the electric motor;
3) when using a valve electric motor (electric motor with permanent magnets) as part of the installation, an electric current is generated that is transmitted through the cable to the control system, which can lead to its failure, as well as to injuries to service personnel or even death.

Known check valves, for example, such as those in the patents for utility model RU55018, RU56940, RU70544, RU76380, RU83799, RU100579, do not have sufficient reliability. During operation, when closing the valve, mechanical impurities contained in the formation fluid can interfere with the hermetic closure of the shut-off element, preventing it from being pressed firmly against the seat. As a result, the fluid begins to flow through the valve, which leads to turbine rotation.

The current Control Systems have a function of protecting from turbine rotation which prevents triggering of the motor turbine rotation and thereby prevent its failure as a result of overloading. Such a type can be known and used, such as CS <<Electon-04>> company <<Electon>>, etc.

However, such CS only solve one problem associated with the turbine rotation.

CS with a soft start function are known, which can ensure a smooth start of the electric motor, including during turbine rotation. In the start mode during turbine rotation, the CS provides a smooth stop of the motor shaft and start in the forward direction. Such well-known and used control systems as Electon-05 of the Electon company, IRZ-500, IRZ-700 of the Izhevsk radio plant, etc. can be attributed to this type.

Such control systems solve two of the three problems identified above associated with turbine rotation.

From the analysis of the technical field it follows that to solve the abovementioned three problems, a device is needed that will block the turbine rotation, but at the same time provide a torque transmission from the electric motor both in the forward and in the reverse direction.

SUMMARY OF THE INVENTION

The aim of the present invention is to increase the reliability and safety of Electric Centrifugal Pumping Unit due to use of the apparatus for preventing rotation of the turbine.

The said technical result is achieved due to the fact that the device for preventing rotation of a turbine consists of interconnected head and base, inside of which two shafts are mounted on bearing supports: the upper and lower shafts, connected to each other through a cam clutch configured to enable free running in the circumferential direction; wherein an overrunning clutch is installed in the head, providing torque transmission in the forward direction from the lower shaft to the upper one and preventing reverse rotation of the upper shaft; the overrunning clutch is connected with the upper shaft through a coupling clutch having a movable part and a stationary part, wherein the movable part is mounted on the upper shaft for axial movement, and the stationary part is rigidly connected to the overrunning clutch; coupling of the coupling clutch is provided by a spring, and disconnection is provided by a pusher mounted on the upper shaft for axial movement, and wherein on one side the pusher is connected to the movable part of the coupling clutch and on the other side—to a bush sleeve having an inclined end surface rigidly mounted on the lower shaft.

In different embodiments of the invention, the coupling clutch can be a cam clutch (claw clutch) or a friction disk, for example, a circular or a conical. In another embodiment of the invention, the friction coupling clutch is a multi-disk friction coupling clutch.

DETAILED DESCRIPTION OF THE INVENTION

Figure 1:
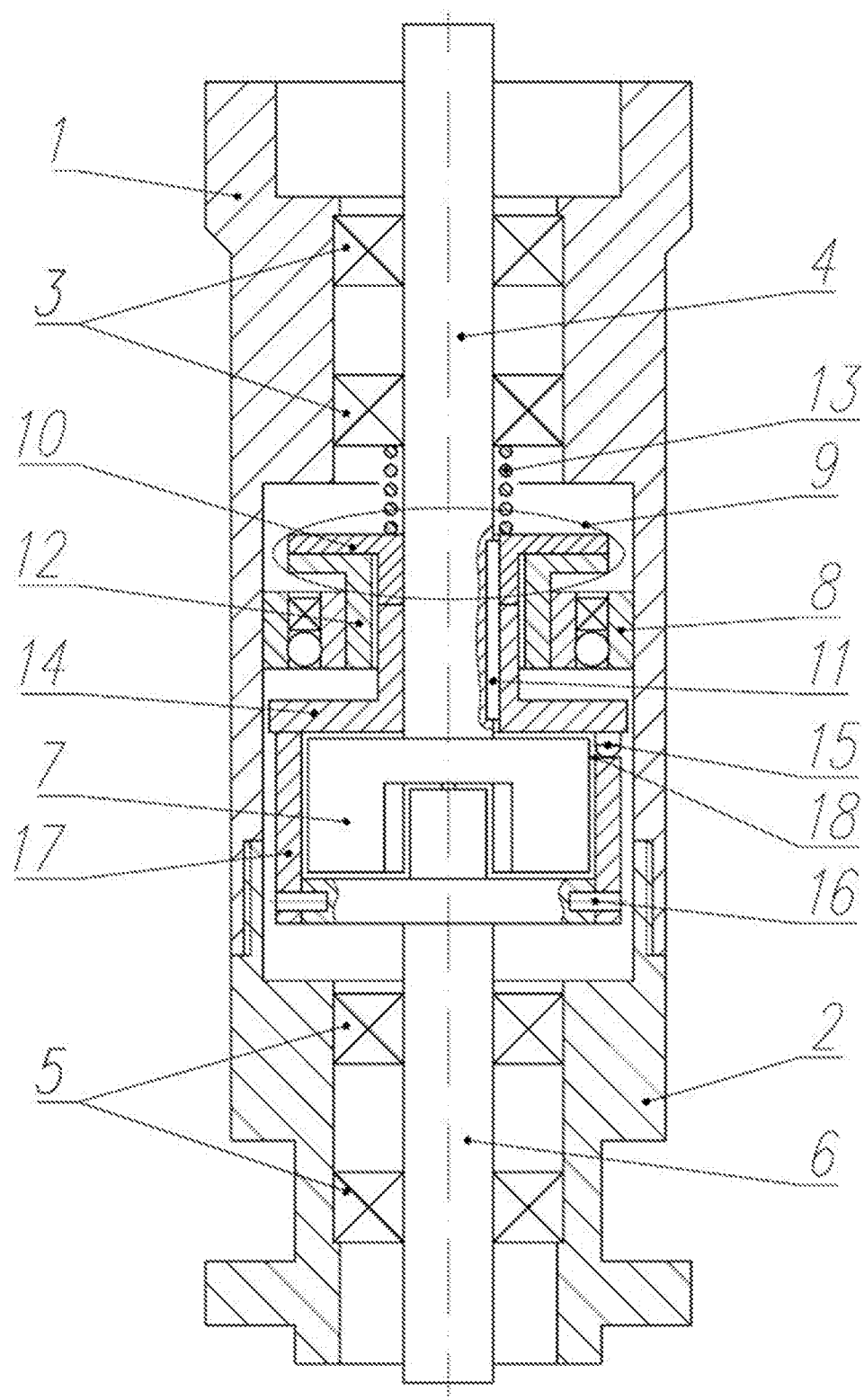
FIG. 1 shows the device for preventing rotation of a turbine, longitudinal section.

In a preferred embodiment of the invention, the device for preventing rotation of a turbine (FIG. 1) consists of the head 1 and the base 2 that are interconnected. The upper shaft 4 is mounted in the head 1 on the bearing support 3, and the lower shaft 6 is mounted in the base 2 on the bearing support 5. The shafts 4 and 6 are connected to each other through a coupling 7 for free travel in the circumferential direction. The overrunning clutch 8 is installed in the head 1, which is connected with the upper shaft through the coupling clutch 9. The movable part 10 of the coupling clutch 9 is mounted on the upper shaft 4 by the key 11 with the possibility of axial displacement, and the stationary part 12 of the clutch 9 is rigidly connected to the overrunning clutch 8.

Coupling of the coupling clutch 9 is provided by the spring 13, which presses the movable part 10 to the stationary part 12.

Figure 2:
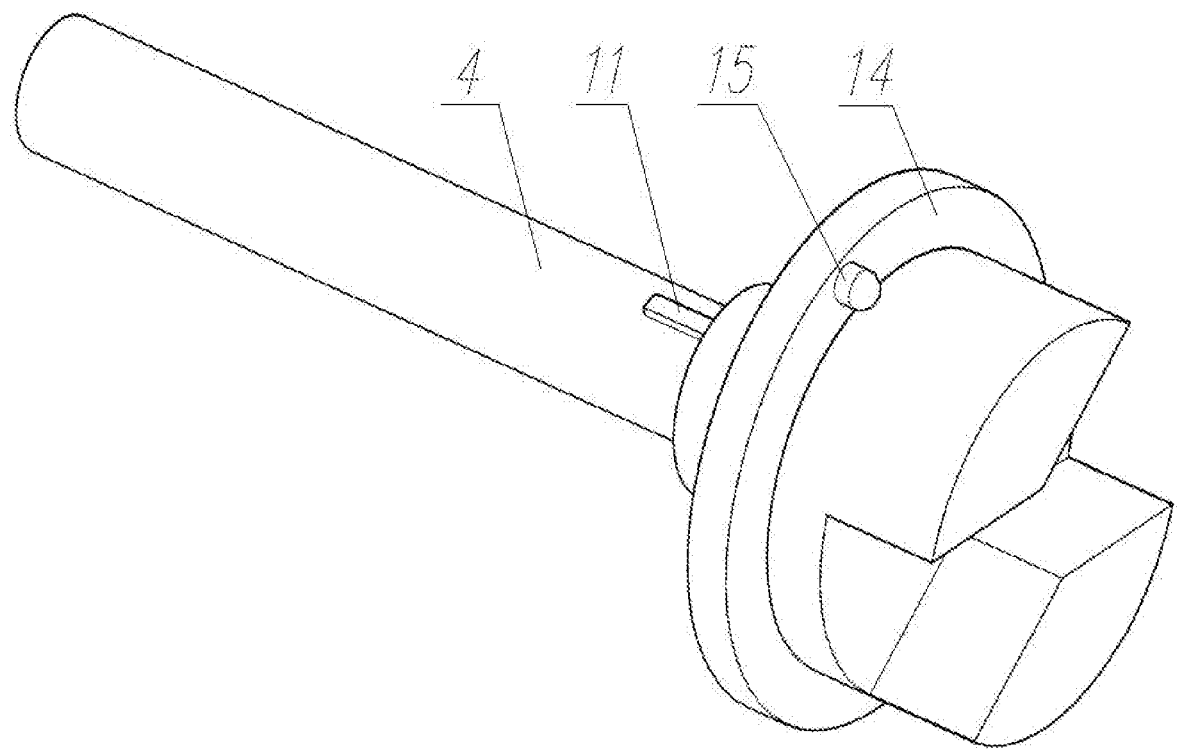
FIG. 2 shows the upper shaft with the pusher.

The pusher 14 is mounted on the upper shaft 4 (FIG. 2) by means of a key 11 with the possibility of axial movement. The pusher 14 is provided with the stop 15.

Figure 3:
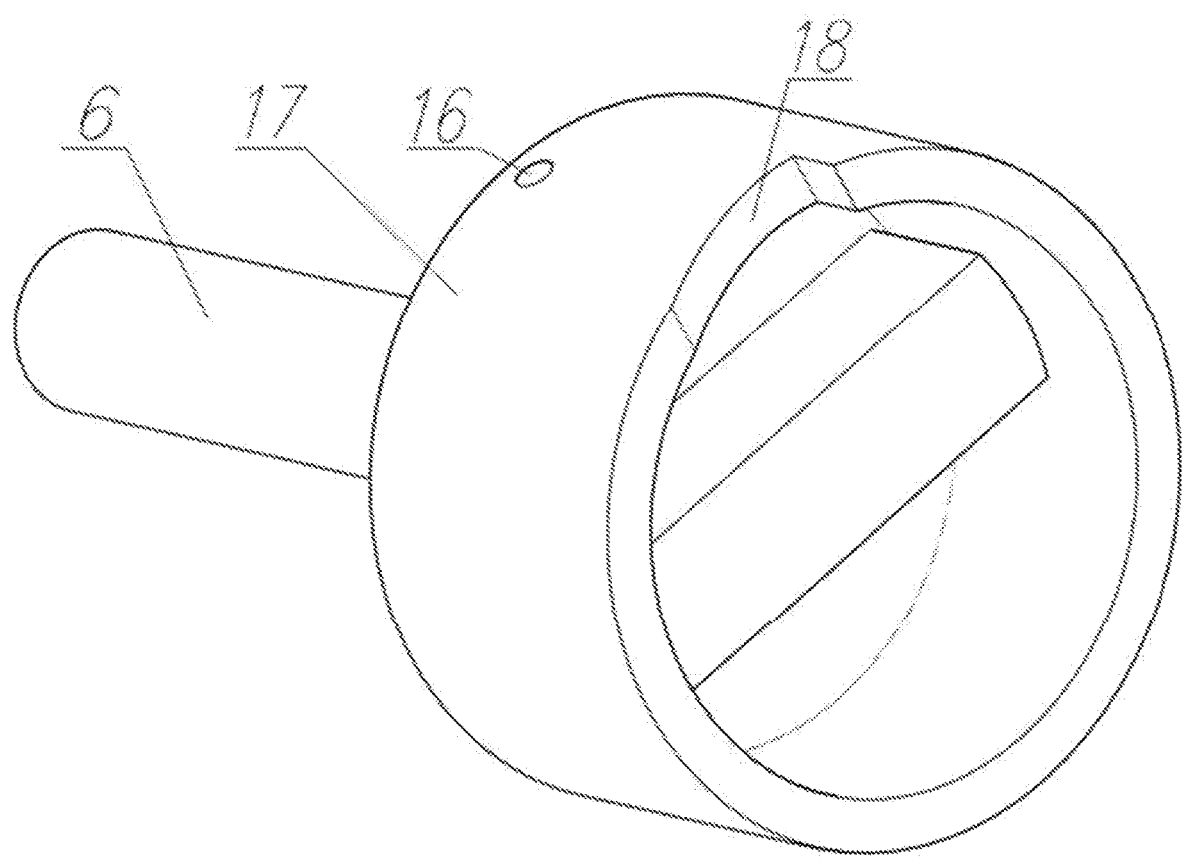
FIG. 3 shows the lower shaft bushing with an inclined end surface.

The bush sleeve 17 with an inclined end surface 18 is mounted on the lower shaft 6 (FIG. 3) by pins 16.

Figure 4:
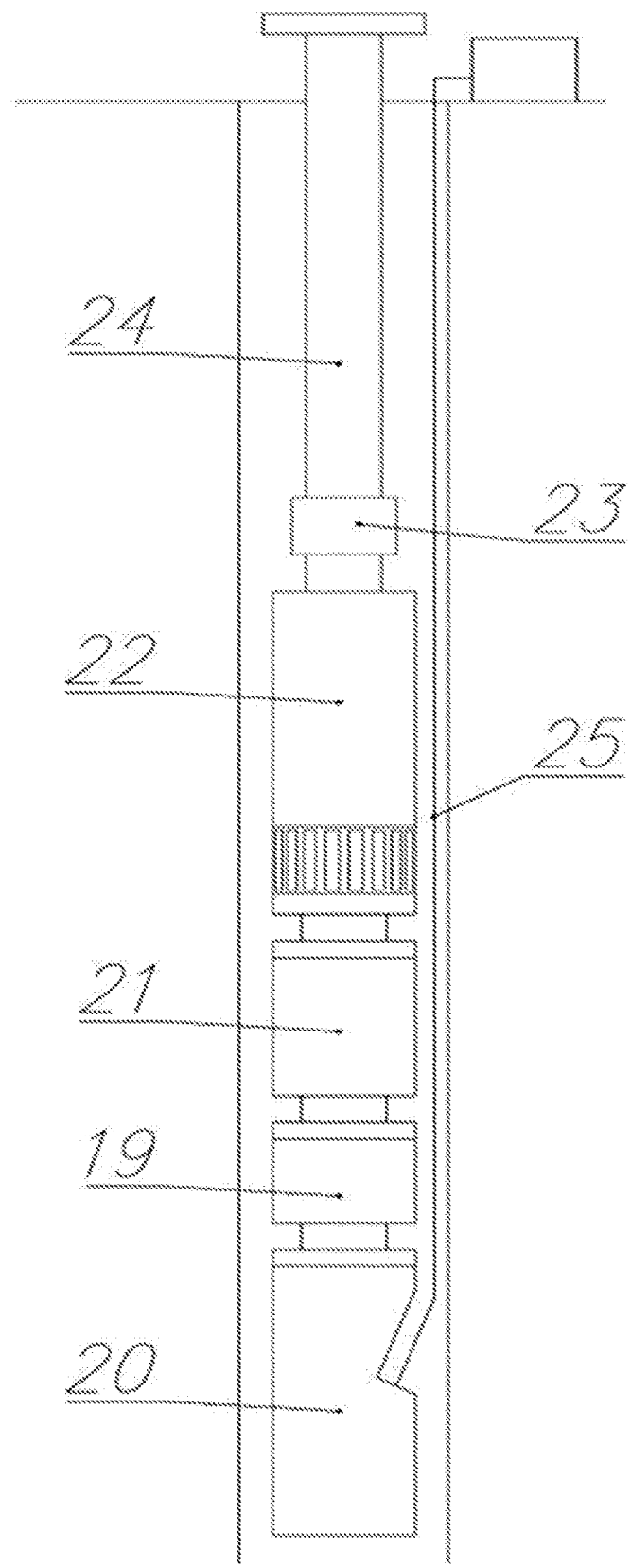
FIG. 4 shows an assembly of the Electric Centrifugal Pumping Unit.

The device for preventing rotation of a turbine 19 is used as a part of the Electric Centrifugal Pumping Unit (FIG. 4), which comprises the following main units: the submersible motor 20, protector of the centrifugal pump 21, centrifugal pump 22, check valve 23. The Electric Centrifugal Pumping Unit is suspended on the column 3 of the tubing 24. The electric motor 20 is powered via the cable 25. The device 19 is mounted between the electric motor 20 and the protector 21. The motor shaft (not shown) is connected to the lower shaft 6, and the shaft of the protector (not shown) is connected to the upper shaft 4.

WORKING EXAMPLE

Before lowering into the borehole, the device 19 is filled with a dielectric oil together with the electric motor 20 and the protector 21.

After the power supply application to the motor 20, the motor shaft transmits forward rotation to the lower shaft 6, which via a coupling 7 transmits rotation to the upper shaft 4; the rotation is further transmitted to the shaft of the protector 21 and to the shaft of the centrifugal pump 22. Production of the formation fluid is carried out.

When the electric motor 20 stops and the check valve 23 is leaking, the liquid from the tubing string 24 begins to drain through the pump, creating a torque on the pump shaft (turbine rotation), which is transmitted to the shaft of the protector 21 and then to the upper shaft 4 of the device 19. The shaft 4 is connected via the coupling clutch 9 with the overrunning clutch 8, which prevents reverse rotation. As a result, the reverse rotation of the shafts of all the nodes of the Electric Centrifugal Pumping Unit is blocked.

Sometimes, when carrying out technological operations in the borehole, it is necessary to transmit reverse rotation from the electric motor 20 to the pump 22. In this case, the reverse rotation of the electric motor shaft is transmitted to the lower shaft 6 of the device 19. Due to the free movement of the coupling 7, the sleeve 17 with an inclined end surface 18 acts on the stop 15, turning relative to it, and moves the pusher 14 in the axial direction, compresses the spring 13 and disconnects the coupling clutch 9. As a result, the overrunning clutch 8 stops blocking the reverse rotation of the upper shaft 4. Next, the reverse rotation is transmitted through the shaft of the hydraulic protector 21 to the pump shaft.

The device for preventing turbine rotation prevents reverse rotation of the motor shaft when the check valve is leaking or absent, and thereby protects the motor from overloading and facilitates its starting at the time of fluid drainage, prevents the generation of electric current during reverse rotation of the motor.

Thus, the solutions used in the present invention can improve the reliability and safety of Electric Centrifugal Pumping Unit operation due to the use of the device for preventing rotation of the turbine as part of the system, and ensure the achievement of the technical result.

The invention claimed is:

1. A device for preventing rotation of a turbine, comprising interconnected head and base, inside of which two shafts are mounted on bearing supports: the two shafts comprise an upper shaft and a lower shaft, connected to each other through a coupling configured to enable free running in the circumferential direction;

wherein an overrunning clutch is installed in the head, providing torque transmission in a forward direction from the lower shaft to the upper one and preventing reverse rotation of the upper shaft;

the overrunning clutch is connected with the upper shaft through a coupling clutch having a movable part and a stationary part, wherein the movable part is mounted on the upper shaft for axial movement, and the stationary part is rigidly connected to the overrunning clutch;

coupling of the coupling clutch is provided by a spring, and disconnection is provided by a pusher mounted on the upper shaft for axial movement, and wherein on one side the pusher is connected to the movable part of the coupling clutch and on another side, different from the one side, the pusher is connected a bush sleeve having an inclined end surface rigidly mounted on the lower shaft.

2. The device according to claim 1, wherein the coupling clutch is a cam clutch.

3. The device according to claim 1, wherein the coupling clutch is friction coupling clutch.

4. The device according to claim 3, wherein the friction coupling clutch has a disk form.

5. The device according to claim 3, wherein the friction coupling clutch is a multi-disk friction coupling clutch.

6. The device according to claim 3, wherein the friction coupling clutch has a conical form.

* * * * *